Figure 1:
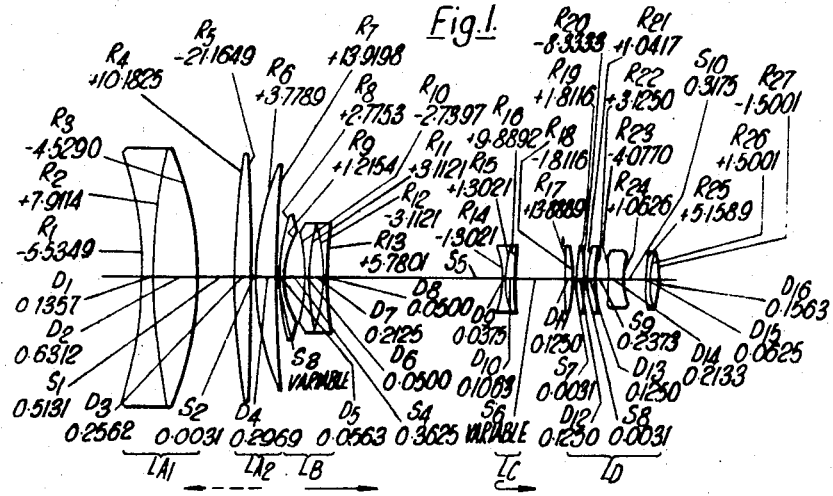

[11] 3,594,066

| [72] | Inventors | Gordon H. Cook<br>Oadby;<br>Peter A. Merigold, Thurnby, both of,<br>England |
|---|---|---|
| [21] | Appl. No. | 758,180 |
| [22] | Filed | Aug. 23, 1968 |
| [45] | Patented | July 20, 1971 |
| [73] | Assignee | The Rank Organization Limited<br>London, England |
| [32] | Priority | Oct. 4, 1962 |
| [33] | | Great Britain |
| [31] | | 37,543/62<br>Continuation of application Ser. No.<br>312,669, Sept. 30, 1963, now abandoned. |

[54] OPTICAL OBJECTIVES OF VARIABLE
EQUIVALENT FOCAL LENGTH
32 Claims, 7 Drawing Figs.

[52] U.S. Cl. .................................................. 350/186,
350/214
[51] Int. Cl. .......................................................G02b 15/18
[50] Field of Search............................................ 350/184,
186

[56] References Cited
UNITED STATES PATENTS
3,038,378  6/1962  Harris et al. .................. 350/186 X
3,069,972  12/1962  Tibbetts et al. ............... 350/186 X Primary Examiner—John K. Corbin
Attorney—Holcombe, Wetherill & Brisebois ABSTRACT: An optical objective of the zoom type having a front member which for a given object position remains stationary during the zooming relative movements, an assembly located behind the front member and incorporating the members of the objective movable for zooming purposes, and a stationary rear member, wherein the front member is divided into front and rear portions and focusing to suit different object positions is effected by axial movement only of the rear portion of the front member, the stationary front portion of the front member being approximately afocal (that is having an equivalent focal length numerically greater than $4f_A$, where $f_A$ is the equivalent focal length of the complete front member for an infinitely distant object) and including a divergent element and a convergent element, whilst the rear portion of the front member is convergent and has an equivalent focal length between $0.75 f_A$ and $1.25 f_A$.

Inventors
G. H. Cook
P. A. Merigold

OPTICAL OBJECTIVES OF VARIABLE EQUIVALENT FOCAL LENGTH

This is a continuation of application, Ser. No. 312,669 filed Sept. 30, 1963, now abandoned.

This invention relates to optical objectives of the "zoom" type, that is of the type having relatively movable members whereby under the control of a zoom control element the equivalent focal length of the objective can be continuously varied throughout a range, whilst maintaining constant position of the image plane, whereby the scale of the image can be varied, the objective being corrected for spherical and chromatic aberrations, coma, astigmatism, field curvature and distortion.

In such objectives, accommodation for change of object position is usually achieved by imparting an additional movement to the front member of the objective. This, however, involves mechanical difficulties, especially in cases where the front member itself participates in the zooming relative movements, for the movements of such member for focusing and for zooming must be independent and superimposed on one another. This difficulty can be avoided by so arranging the system that the front member does not participate in the zooming relative movements, so that its movements are confined only to those required for focusing purposes. Even in this case, however, mechanical difficulties still arise, when there is a wide range of variation of equivalent focal length, for in practice the front member must have a wide relative aperture and must also be of relatively complex structure in order to facilitate correction of the various aberrations not only throughout the zooming range but also throughout the focusing range, and must consequently be quite heavy and bulky. It is important to keep the weight and bulk of the complete objective including its operating mechanisms, within easily manageable proportions, and it has been proposed therefore to simplify the focusing mechanism by allowing the front member to rotate as it moves forward on its screw thread, but, in order to reduce the driving torque, it is often found necessary to use expensive and heavy ball threads rather than the conventional simple screw threads. Again, the absence of a nonrotating part at the front of the objective makes it difficult to fit ray shades and rain shades, and the addition of such shades to the moving parts further increases the weight to be moved.

The present invention has for its object to provide an improved focusing arrangement for a zoom objective, wherein such difficulties are materially reduced.

The optical objective of the zoom type according to the present invention comprises a front member which for a given object position remains stationary during the zooming relative movements, an assembly located behind the front member and incorporating the members of the objective movable for zooming purposes, and a stationary rear member, wherein the front member is divided into front and rear portions and focusing to suit different object positions is effected by axial movement only of the rear portion of the front member, the stationary front portion of the front member being approximately afocal (that is having an equivalent focal length numerically greater than $4f_A$, where $f_A$ is the equivalent focal length of the complete front member for an infinitely distant object) and including a divergent element and a convergent element, whilst the rear portion of the front member is convergent and has an equivalent focal length between $0.75f_A$ and $1.25f_A$.

It is to be understood that the terms "front" and "rear" as used herein relate respectively to the sides of the objective nearer to and further from the longer conjugate, in accordance with the usual convention. It should also be made clear that the term "internal contact," as herein used in connection with a compound component, is intended to include, not only a cemented contact, but also what is often known as a "broken contact," that is one in which the two contacting surfaces have slightly different radii of curvature, the effective radius of curvature of such a broken contact being the arithmetic mean between the radii of curvature of the individual contacting surfaces, whilst the optical power of the broken contact is the harmonic mean between the optical powers of the individual contacting surfaces.

For assisting to stabilize chromatic aberration throughout the focusing range the stationary front portion of the front member preferably consists of two elements made of materials whose Abbe V numbers differ by more than 25. For the same purpose, the arithmetic mean of the Abbe V numbers of the materials of the convergent elements of the complete front member preferably exceeds that of the divergent element or elements of the front member by at least 20.

The mean refractive indices of the materials of the said two elements of the front portion of the front member preferably differ by between 0.18 and 0.24, thus assisting towards stabilization of spherical aberration and astigmatism throughout the focusing range.

The rear surface of the complete front member is preferably convex to the front with radius of curvature between $2.5 f_A$ and $5.0 f_A$. This gives further assistance towards stabilization of primary astigmatism throughout the focusing movements, and in addition also provides a degree of primary and higher order astigmatism which will cooperate with those of the members movable for zooming purposes in helping to achieve stabilization of such aberrations throughout the range of zooming movements.

The equivalent focal length $f_A$ of the complete front member preferably lies between 1.2 and 2.4 times the maximum value of the ratio between the equivalent focal length of the complete objective and the F-number of the objective. This assists in keeping the overall dimensions of the objective and also the relative aperture of the front member as small as possible.

The stationary front portion of the front member preferably consists of a divergent meniscus doublet component having its front and rear surfaces concave to the front. This feature assists towards locating the rear nodal point of the complete front member well to the rear and sometimes beyond the rear surface of the front member, thus making it possible, not only to accommodate the desired movements of the members of the assembly behind the front member movable for zooming purposes without risk of fouling between the front member and such assembly and with minimum increase in the overall length of the objective, but also to achieve a good compromise between the diameters and relative apertures of the individual members.

For assisting to maintain stability of spherical aberration and astigmatism throughout the range of focusing movements, the Petzval contribution of the front surface of the doublet component of the front member preferably lies between 0.85 and 1.15 times that of the rear surface of such doublet component, the internal contact in such doublet component being convex to the front and having a radius of curvature between $1.5f_A$ and $3.0f_A$.

The front surface of the doublet component of the front member preferably has dispersive optical power lying numerically between $0.4/f_A$ and $1.0/f_A$. This further assists towards locating the rear nodal point of the front member far to the rear.

The movable rear portion of the front member preferably consists of two simple convergent components. Preferably, the axial thickness of the doublet component of the front member is less than $0.25 f_A$ and is greater than the sum of the axial thicknesses of the two simple components of the front member, such sum in turn being greater than $0.075 f_A$. These features also contribute towards the desired rearward location of the rear nodal point of the front member.

The front surfaces of the two simple components of the front member are preferably convex to the front, the radius of curvature of the more forward of such front surfaces being less than $4 f_A$ and greater than twice the radius of curvature of the other of such front surfaces, such latter radius of curvature in turn being greater than $0.75 f_A$. These features cooperate with those of the front portion of the front member to assist towards stabilization of spherical aberration and astigmatism throughout the focusing movements.

The focusing arrangement according to the present invention is especially suitable for use with zoom objectives designed to give a very wide range of variation of equivalent focal length, such for example as that forming the subject of the present applicants' copending U.S. Pat. application, Ser. No. 309,208, for it is especially such wide range objectives which call for the use of heavy and bulky front members. It is of interest to note that an advantage of making the front portion of the front member strictly afocal is that this is the condition at which the movement of the rear portion necessary for focusing is at a minimum. Although from this viewpoint it would be preferable to make the front portion afocal, some appreciable departure from strict afocality makes very little difference to the amount of movement of the rear portion and can therefore be tolerated. In particular, when applied to the zoom objective of the above-mentioned copending application, it is desirable to depart from strict afocality to make the front portion slightly divergent, although in fact materially less divergent than in the examples given in the specification of such copending application.

Thus, in one group of arrangements, the stationary rear member is convergent, and the assembly incorporating the members movable for zooming purposes comprises two movable divergent members respectively constituting the second and third members of the objective.

The minimum separation between such movable second and third members preferably occurs when the equivalent focal length of the complete objective is greater than half its maximum value in the range of variation, the equivalent focal lengths $f_B$ and $f_C$ respectively of the second and third members lying respectively between 4 and 8 times the minimum value of the ratio of the equivalent focal length of the objective to the $f$-number of the objective in the range of variation and between 5 and 10 times such minimum ratio. These features contribute towards keeping the overall dimensions of the objective as small as possible and achieving the best compromise between the diameters and the relative apertures of the individual members thereof.

The movable second member preferably consists of a divergent simple meniscus component having its surfaces convex to the front followed by a divergent compound component, the total axial movement of such second member in the range of variation lying numerically between 1.5 $f_B$ and 2.5 $f_B$. These features permit the front nodal point of the second member to be located as far forward as possible and also assist towards reducing the overall dimensions of the objective.

The movable third member preferably consists of a doublet component having its front surface concave towards the front with radius of curvature numerically between 0.5 $f_C$ and 1.0 $f_C$, the total axial movement of the third member in the range of variation lying numerically between 0.25 $f_C$ and 0.5 $f_C$. These features permit the front nodal point of the third member to be located as far forward as possible, and also assist in stabilization of spherical aberration and coma throughout the range of variation.

In another group of arrangements, the assembly incorporating the members movable for zooming purposes comprises a movable divergent member constituting the second member of the objective followed by a movable convergent member constituting the third member of the objective. These members may, for instance, be arranged in the manner described in the specification of the present applicants' copending U.S. Pat. application, Ser. No. 288,412, now abandoned.

In this case, the assembly incorporating the members movable for zooming purposes preferably performs as a whole an axial movement bearing a nonlinear relationship to the movement of the zoom control element, whilst at the same time within such assembly the second and third members perform axial movements in opposite directions each of which bears a linear relationship to the movement of the zoom control element, the two members moving towards one another during change from smaller to larger values of the equivalent focal length of the objective. The total axial movement of the divergent second member of the objective relatively to the stationary members of the objective in the range of variation preferably lies numerically between 0.67 $f_B$ and 2.0 $f_B$ and also between 0.75 and 2.5 times the total axial movement of the convergent third member of the objective. These features assist in enabling a wide range of variation of equivalent focal length to be achieved, whilst at the same time avoiding undue increase in the relative apertures of the individual members and in the overall dimensions of the objective.

If desired, an achromatic doublet component may be provided, which can be placed at will behind the stationary rear member of the objective to increase the values of the equivalent focal length of the objective by a chosen ratio throughout the range of variation.

Figure 2:
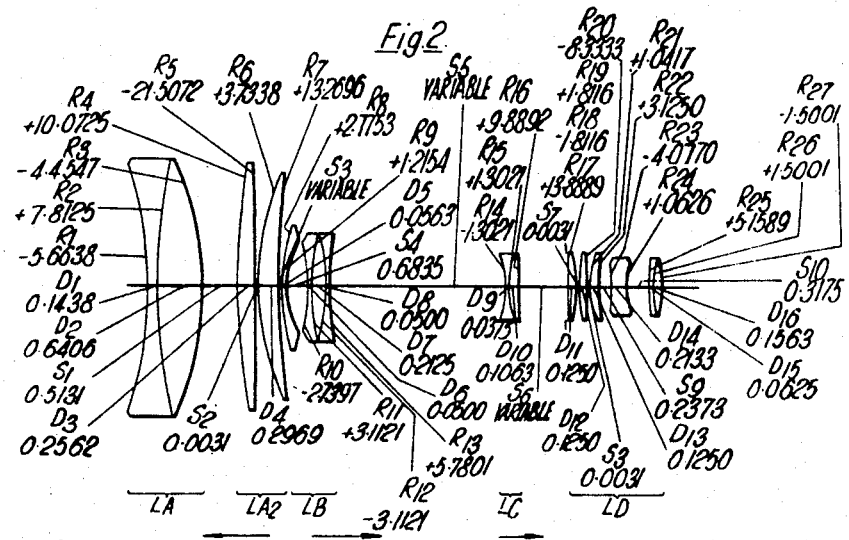
Figure 3:
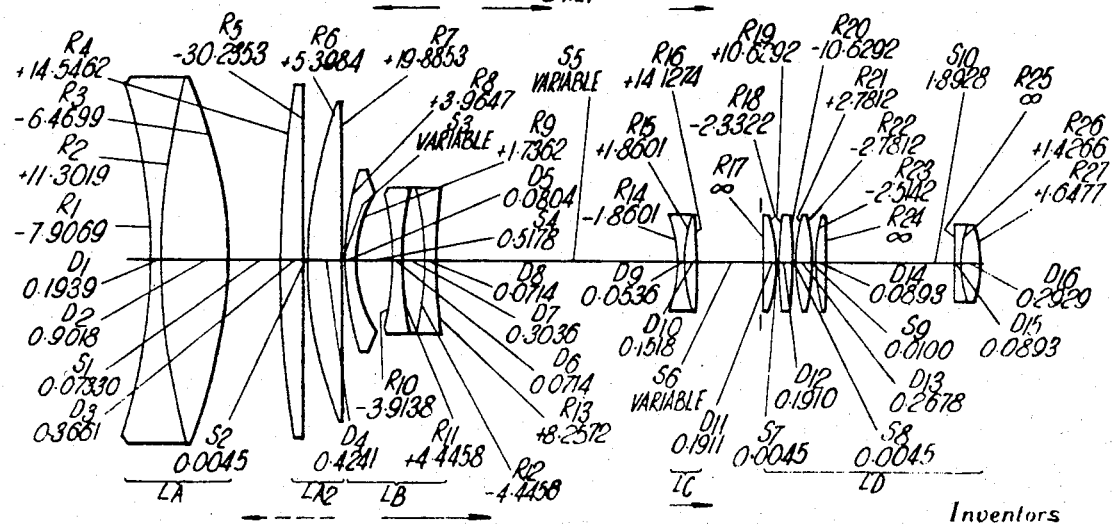
Figure 4:
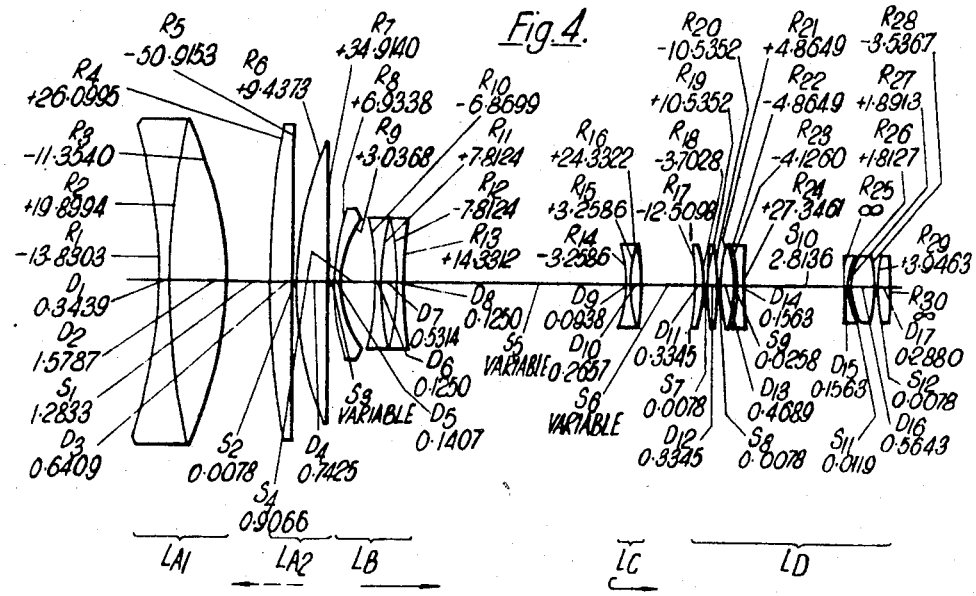
Figure 5:
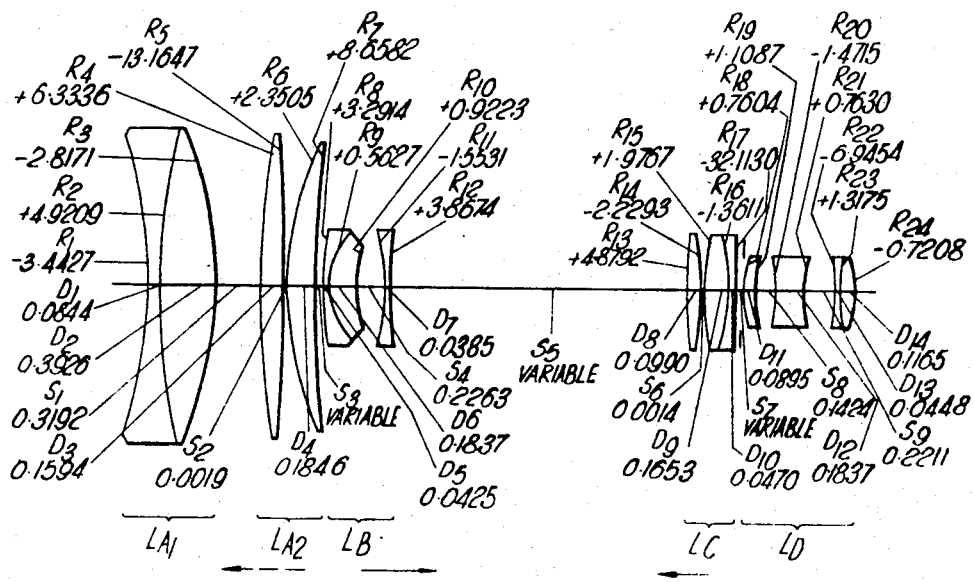
Figure 6:
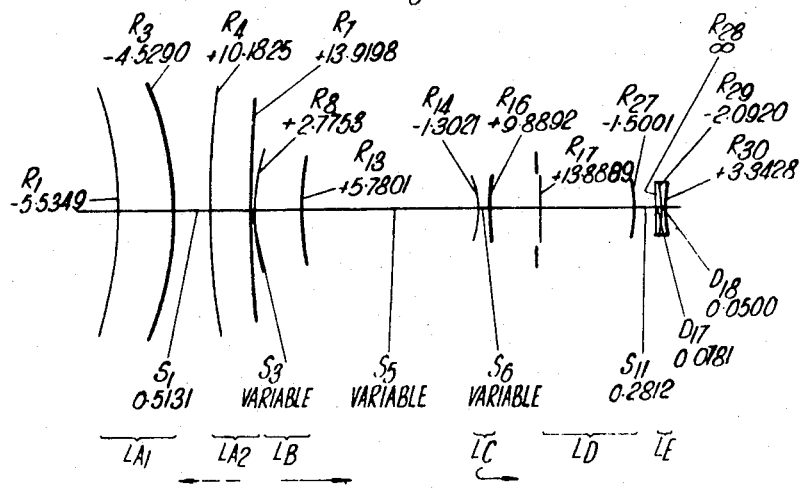
Figure 7:
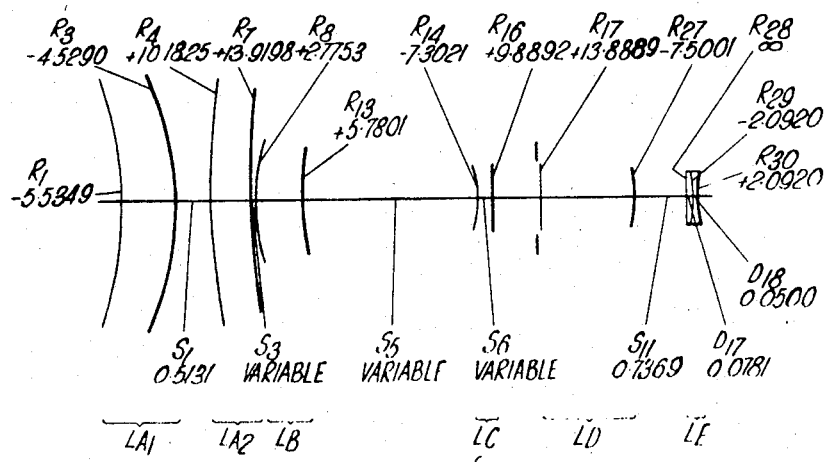

Some convenient practical examples of zoom objective according to the invention are illustrated diagrammatically in the accompanying drawings, in which FIGS. 1—4 respectively illustrate four examples FIG. 4 being on half the scale of FIGS. 1—3), which also incorporate the invention of the copending U.S. Pat. application, Ser. No. 309,208 above-mentioned, the movable second and third members being divergent, FIG. 5 illustrates an example (on twice the scale of FIGS. 1—3), which incorporates also the invention of the copending U. S. Pat. application Ser. No. 288,412 above-mentioned, the movable second member being divergent and the movable third member convergent, and FIGS. 6 and 7 show the example of FIG. 1 (in skeleton form) modified by the addition respectively of two alternative constructions of achromatic doublet component detachably mounted behind the stationary rear member of the objective.

Numerical data for these seven examples are given in the following tables (numbered correspondingly to the figures of the drawings), in which $R_1$ $R_2$ ..... represent the radii of curvature of the individual surfaces of the objective counting from the front, the positive sign indicating that the surface is convex to the front and the negative sign that it is concave thereto, $D_1$ $D_2$ ..... represent the axial thicknesses of the individual elements of the objective, and $S_1$ $S_2$ ..... represent the axial air separations between the components of the objective. The tables also give the mean refractive indices $n_d$ for the $d$-line of the spectrum and the Abbe V numbers of the materials of which the various elements are made, and in addition the clear diameters of the various surfaces of the objective.

The second section of each of the first five tables gives the values of the three axial air separations which vary for zooming purposes between the four members of the objective for a number of representative positions throughout the zooming range, for which the corresponding values of the equivalent focal length F of the complete objective from its minimum value $F_o$ to its maximum value $F_m$ are also given, together with the corresponding values of log F.

The third section of each of the first five tables gives, for each of a set of representative values of the distance $d$ of the object in front of the surface $R_1$, the variations $\Delta S_1$ and $\Delta S_3$ from the values of $S_1$ and $S_3$ given in the first and second sections of the table, due to the focusing movement of the rear portion of the front member to suit such object distances. Other values can of course be calculated, if desired, by interpolation between such representative values in the well-known manner.

Some of the tables also have a fourth section giving the equation defining an axial section through an aspheric surface provided in the stationary rear member of the objective, the radius of curvature given in the first section of the table for such surface being the radius of curvature at the vertex of the surface on the optical axis of the objective.

The dimensions in each table are given in terms of the minimum value $F_o$ of the equivalent focal length of the objective. The dimensions given in each table are those obtaining when the objective is focused on an object at infinity.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

EXAMPLE I

| Radius | Thickness or air separation | Refractive index $n_d$ | Abbé V number | Clear diameter |
|---|---|---|---|---|
| $R_1 = -5.5349$ | | | | $R_1 = 3.487$ |
| | $D_1 = 0.1357$ | 1.7847 | 26.10 | |
| $R_2 = +7.9114$ | | | | $R_2 = 3.529$ |
| | $D_2 = 0.6312$ | 1.57427 | 52.02 | |
| $R_3 = -4.5290$ | | | | $R_3 = 3.529$ |
| | $S_1 = 0.5131$ | | | |
| $R_4 = +10.1825$ | | | | $R_4 = 3.399$ |
| | $D_3 = 0.2562$ | 1.6888 | 49.48 | |
| $R_5 = -21.1649$ | | | | $R_5 = 3.385$ |
| | $S_2 = 0.0031$ | | | |
| $R_6 = +3.7789$ | | | | $R_6 = 3.120$ |
| | $D_4 = 0.2969$ | 1.6888 | 49.48 | |
| $R_7 = +13.9198$ | | | | $R_7 = 3.085$ |
| | $S_3 =$ variable | | | |
| $R_8 = +2.7753$ | | | | $R_8 = 1.7000$ |
| | $D_5 = 0.0563$ | 1.69734 | 56.19 | |
| $R_9 = +1.2154$ | | | | $R_9 = 1.4812$ |
| | $S_4 = 0.3625$ | | | |
| $R_{10} = -2.7397$ | | | | $R_{10} = 1.4712$ |
| | $D_6 = 0.0500$ | 1.69734 | 56.19 | |
| $R_{11} = +3.1121$ | | | | $R_{11} = 1.4092$ |
| | $D_7 = 0.2125$ | 1.7847 | 26.10 | |
| $R_{12} = -3.1121$ | | | | $R_{12} = 1.3947$ |
| | $D_8 = 0.0500$ | 1.69734 | 56.19 | |
| $R_{13} = +5.7801$ | | | | $R_{13} = 1.3412$ |
| | $S_5 =$ variable | | | |
| $R_{14} = -1.3021$ | | | | $R_{14} = 0.7807$ |
| | $D_9 = 0.0375$ | 1.69734 | 56.19 | |
| $R_{15} = +1.3021$ | | | | $R_{15} = 0.8205$ |
| | $D_{10} = 0.1063$ | 1.7847 | 26.10 | |
| $R_{16} = +9.8892$ | | | | $R_{16} = 0.8300$ |
| | $S_6 =$ variable | | | |
| $R_{17} = +13.8889$ | | | | $R_{17} = 0.8865$ |
| | $D_{11} = 0.1250$ | 1.524 | 58.87 | |
| $R_{18} = -1.8116$ | | | | $R_{18} = 0.9017$ |
| | $S_7 = 0.0031$ | | | |
| $R_{19} = +1.8116$ | | | | $R_{19} = 0.9157$ |
| | $D_{12} = 0.1250$ | 1.524 | 58.87 | |
| $R_{20} = -8.3333$ | | | | $R_{20} = 0.9102$ |
| | $S_8 = 0.0031$ | | | |
| $R_{21} = +1.0417$ | | | | $R_{21} = 0.8858$ |
| | $D_{13} = 0.1250$ | 1.524 | 58.87 | |
| $R_{22} = +3.1250$ | | | | $R_{22} = 0.8602$ |
| | $S_9 = 0.2373$ [1] | | | |
| $R_{23} = -4.0770$ | | | | $R_{23} = 0.7560$ |
| | $D_{14} = 0.2133$ | 1.7283 | 28.66 | |
| $R_{24} = +1.0626$ | | | | $R_{24} = 0.6907$ |
| | $S_{10} = 0.3175$ | | | |
| $R_{25} = +5.1589$ | | | | $R_{25} = 0.7197$ |
| | $D_{15} = 0.0625$ | 1.7823 | 28.66 | |
| $R_{26} = +1.5001$ | | | | $R_{26} = 0.7200$ |
| | $D_{16} = 0.1563$ | 1.61452 | 56.22 | |
| $R_{27} = -1.5001$ | | | | $R_{27} = 0.7225$ |

[1] Aspheric.

| $S_3$ | $S_5$ | $S_6$ | F | Log F |
|---|---|---|---|---|
| 0.03128 | 2.54423 | 0.68858 | 1.00000 | 0.00 |
| 1.11514 | 1.40738 | 0.74157 | 1.77827 | 0.25 |
| 1.93535 | 0.60353 | 0.72521 | 3.16227 | 0.50 |
| 2.55181 | 0.16104 | 0.55123 | 5.62339 | 0.75 |
| 2.96338 | 0.16657 | 0.13414 | 10.00000 | 1.00 |

| d | $\Delta S_1$ | $\Delta S_3$ |
|---|---|---|
| ∞ | 0 | 0 |
| 357 | −0.0575 | −0.0575 |
| 179 | −0.1162 | +0.1162 |
| 135 | −0.1556 | +0.1556 |
| 90 | −0.2381 | +0.2381 |
| 67 | −0.3256 | +0.3256 |
| 45 | −0.5069 | +0.5069 |

Equation for aspheric surface $R_{23}$:
$$x = -4.077 + \sqrt{16.62193 - y^2} - 0.02459203\, y^4 + 0.08899172\, y^6 - 0.02440590\, y^8 - 0.07442450\, y^{10}$$

EXAMPLE II

| Radius | Thickness or air separation | Refractive index $n_d$ | Abbé V number | Clear diameter |
|---|---|---|---|---|
| $R_1 = -5.6638$ | | | | $R_1 = 3.497$ |
| | $D_1 = 0.1438$ | 1.7618 | 26.78 | |
| $R_2 = +7.8125$ | | | | $R_2 = 3.530$ |
| | $D_2 = 0.6406$ | 1.54065 | 59.54 | |
| $R_3 = -4.4547$ | | | | $R_3 = 3.540$ |
| | $S_1 = 0.5131$ | | | |
| $R_4 = +10.0725$ | | | | $R_4 = 3.399$ |
| | $D_3 = 0.2562$ | 1.6888 | 49.48 | |
| $R_5 = -21.5072$ | | | | $R_5 = 3.385$ |
| | $S_2 = 0.0031$ | | | |
| $R_6 = +3.7338$ | | | | $R_6 = 3.120$ |
| | $D_4 = 0.2969$ | 1.6888 | 49.48 | |
| $R_7 = +13.2696$ | | | | $R_7 = 3.085$ |
| | $S_3 =$ variable | | | |
| $R_8 = +2.7753$ | | | | $R_8 = 1.7000$ |
| | $D_5 = 0.0563$ | 1.69734 | 56.19 | |
| $R_9 = +1.2154$ | | | | $R_9 = 1.4812$ |
| | $S_4 = 0.3625$ | | | |
| $R_{10} = -2.7397$ | | | | $R_{10} = 1.4712$ |
| | $D_6 = 0.0500$ | 1.69734 | 56.19 | |
| $R_{11} = +3.1121$ | | | | $R_{11} = 1.4092$ |
| | $D_7 = 0.2125$ | 1.7847 | 26.10 | |
| $R_{12} = -3.1121$ | | | | $R_{12} = 1.3947$ |
| | $D_8 = 0.0500$ | 1.69734 | 56.19 | |
| $R_{13} = +5.7801$ | | | | $R_{13} = 1.3412$ |
| | $S_5 =$ variable | | | |
| $R_{14} = -1.3021$ | | | | $R_{14} = 0.7807$ |
| | $D_9 = 0.0375$ | 1.69734 | 56.19 | |
| $R_{15} = +1.3021$ | | | | $R_{15} = 0.8205$ |
| | $D_{10} = 0.1063$ | 1.7847 | 26.10 | |
| $R_{16} = +9.8892$ | | | | $R_{16} = 0.8300$ |
| | $S_6 =$ variable | | | |
| $R_{17} = +13.8889$ | | | | $R_{17} = 0.8865$ |
| | $D_{11} = 0.1250$ | 1.524 | 58.87 | |
| $R_{18} = -1.8116$ | | | | $R_{18} = 0.9017$ |
| | $S_7 = 0.0031$ | | | |
| $R_{19} = +1.8116$ | | | | $R_{19} = 0.9157$ |
| | $D_{12} = 0.1250$ | 1.524 | 58.87 | |
| $R_{20} = -8.3333$ | | | | $T_{20} = 0.9102$ |
| | $S_8 = 0.0031$ | | | |
| $R_{21} = +1.0417$ | | | | $R_{21} = 0.8858$ |
| | $D_{13} = 0.1250$ | 1.524 | 58.87 | |
| $R_{22} = +3.1250$ | | | | $R_{22} = 0.8602$ |
| | $S_9 = 0.2373$ [1] | | | |
| $R_{23} = -3.0770$ | | | | $R_{23} = 0.7560$ |
| | $D_{14} = 0.2133$ | 1.7283 | 28.66 | |
| $R_{24} = +1.0626$ | | | | $R_{24} = 0.6907$ |
| | $S_{10} = 0.3175$ | | | |
| $R_{25} = +5.1589$ | | | | $R_{25} = 0.7197$ |
| | $D_{15} = 0.0625$ | 1.7283 | 28.66 | |
| $R_{26} = +1.5001$ | | | | $R_{26} = 0.7200$ |
| | $D_{16} = 0.1563$ | 1.61452 | 56.22 | |
| $R_{27} = -1.5001$ | | | | $R_{27} = 0.7225$ |

[1] Aspheric.

| $S_3$ | $S_5$ | $S_6$ | F | Log F |
|---|---|---|---|---|
| 0.03128 | 2.54423 | 0.68858 | 1.00000 | 0.00 |
| 1.11514 | 1.40738 | 0.74157 | 1.77827 | 0.25 |
| 1.93535 | 0.60353 | 0.72521 | 3.16227 | 0.50 |
| 2.55181 | 0.16104 | 0.55123 | 5.62339 | 0.75 |
| 2.96338 | 0.16657 | 0.13414 | 10.00000 | 1.00 |

| d | $\Delta S_1$ | $\Delta S_3$ |
|---|---|---|
| ∞ | 0 | 0 |
| 360 | −0.0575 | +0.0575 |
| 180 | −0.1162 | +0.1162 |
| 135 | −9.1556 | +0.1556 |
| 90 | −0.2381 | +0.2381 |
| 67 | −0.3256 | +0.3256 |
| 45 | −0.5069 | +0.5069 |

Equation for aspheric surface $R_{23}$:
$$x = -4.077 + \sqrt{16.62193 - y^2} - 0.02459203\, y^4 + 0.08899172\, y^6 - 0.02440590\, y^8 - 0.07442450\, y^{10}$$

EXAMPLE III

| Radius | Thickness or air separation | Refractive index $n_d$ | Abbé V number | Clear diameter |
|---|---|---|---|---|
| $R_1 = -7.9069$ | | | | $R_1 = 4.9814$ |
| | $D_1 = 0.1939$ | 1.7847 | 26.10 | |
| $R_2 = +11.3019$ | | | | $R_2 = 5.0414$ |
| | $D_2 = 0.9018$ | 1.57427 | 52.02 | |
| $R_3 = -6.4699$ | | | | $R_3 = 5.0557$ |
| | $S_1 = 0.7330$ | | | |
| $R_4 = +14.5462$ | | | | $R_4 = 4.8557$ |
| | $D_3 = 0.3661$ | 1.6888 | 49.48 | |
| $R_5 = -30.2353$ | | | | $R_5 = 4.8357$ |
| | $S_2 = 0.0045$ | | | |
| $R_6 = +5.3984$ | | | | $R_6 = 4.4571$ |
| | $D_4 = 0.4241$ | 1.6888 | 49.48 | |

EXAMPLE III—Continued

| Radius | Thickness or air separation | Refractive index $n_d$ | Abbe V number | Clear diameter |
|---|---|---|---|---|
| $R_7=+19.8853$ | | | | $R_7=4.4071$ |
| $R_8=+3.9647$ | $S_3$=variable | | | $R_8=4.4286$ |
| $R_9=+1.7362$ | $D_3=0.0604$ | 1.69734 | 56.19 | $R_9=2.1161$ |
| $R_{10}=-3.9138$ | $S_4=0.5178$ | | | $R_{10}=2.1018$ |
| $R_{11}=+4.4458$ | $D_4=0.0714$ | 1.69734 | 56.19 | $R_{11}=2.0132$ |
| $R_{12}=-4.4458$ | $D_5=0.3036$ | 1.7847 | 26.10 | $R_{12}=1.9925$ |
| $R_{13}=+8.2572$ | $D_6=0.0714$ | 1.69734 | 56.19 | $R_{13}=1.9161$ |
| $R_{14}=-1.8601$ | $S_5$=variable | | | $R_{14}=1.1153$ |
| $R_{15}=+1.8601$ | $D_9=0.0536$ | 1.69734 | 56.19 | $R_{15}=1.1721$ |
| $R_{16}=+14.1274$ | $D_{10}=0.1518$ | 1.7847 | 26.10 | $R_{16}=1.1857$ |
| $R_{17}=\infty$ | $S_6$=variable | | | $R_{17}=1.2830$ |
| $R_{18}=-2.3322$ | $D_{11}=0.1911$ | 1.524 | 58.87 | $R_{18}=1.3098$ |
| $R_{19}=+10.6292$ | $S_7=0.0045$ | | | $R_{19}=1.3238$ |
| $R_{20}=-10.6292$ | $D_{12}=0.1910$ | 1.524 | 58.87 | $R_{20}=1.3288$ |
| $R_{21}=+2.7812$ | $S_8=0.0045$ | | | $R_{21}=1.3273$ |
| $R_{22}=-2.7812$ | $D_{13}=0.2678$ | 1.61342 | 59.27 | $R_{22}=1.3060$ |
| $R_{23}=-2.5142$ | $S_9=0.0100$ | | | $R_{23}=1.3049$ |
| $R_{24}=\infty$ | $D_{14}=0.0893$ | 1.72830 | 28.66 | $R_{24}=1.2833$ |
| $R_{25}=\infty$ | $S_{10}=1.8928$ | | | $R_{25}=0.9600$ |
| $R_{26}=+1.4266$ | $D_{15}=0.0893$ | 1.72830 | 28.66 | $R_{26}=0.9600$ |
| $R_{27}=+1.6477$ | $S_{11}=0.0298$ | | | $R_{27}=0.9600$ |
| $R_{28}=-2.7352$ | $D_{16}=0.2929$ | 1.69734 | 56.19 | $R_{28}=0.9600$ |

| $S_3$ | $S_5$ | $S_6$ | F | Log F |
|---|---|---|---|---|
| 0.04468 | 3.63462 | 1.0319 | 1.00000 | 0.0 |
| 1.59306 | 2.01054 | 1.1076 | 1.77827 | 0.25 |
| 2.76479 | 0.86219 | 1.08422 | 3.16227 | 0.50 |
| 3.64545 | 0.23005 | 0.83569 | 5.62339 | 0.75 |
| 4.23340 | 0.23796 | 0.23984 | 10.00000 | 1.00 |

| d | $\Delta S_1$ | $\Delta S_3$ |
|---|---|---|
| $\infty$ | 0 | 0 |
| 511 | −0.0822 | +0.0822 |
| 256 | −0.1660 | +0.1660 |
| 193 | −0.2223 | +0.2223 |
| 128 | −0.3401 | +0.3401 |
| 96 | −0.4651 | +0.4651 |
| 64 | −0.7241 | +0.7241 |

EXAMPLE IV

| Radius | Thickness or air separation | Refractive index $n_d$ | Abbe V number | Clear diameter |
|---|---|---|---|---|
| $R_1=-13.8303$ | $D_1=0.3439$ | 1.78467 | 26.10 | $R_1=8.7220$ |
| $R_2=+19.8994$ | $D_2=1.5787$ | 1.57369 | 52.11 | $R_2=8.8289$ |
| $R_3=-11.3540$ | $S_1=1.2833$ | | | $R_3=8.8550$ |
| $R_4=+26.0995$ | $D_3=0.6409$ | 1.68958 | 49.47 | $R_4=8.5095$ |
| $R_5=-50.9153$ | $S_2=0.0078$ | | | $R_5=8.4750$ |
| $R_6=+9.4373$ | $D_4=0.7425$ | 1.68962 | 49.51 | $R_6=7.8077$ |
| $R_7=+34.9140$ | $S_3$=variable | | | $R_7=7.7243$ |
| $R_8=+6.9388$ | $D_5=0.1407$ | 1.69681 | 56.33 | $R_8=4.2516$ |
| $R_9=+3.0368$ | $S_4=0.9066$ | | | $R_9=3.7045$ |
| $R_{10}=-6.8699$ | $D_6=0.1250$ | 1.69681 | 56.33 | $R_{10}=3.6795$ |
| $R_{11}=+7.8124$ | $D_7=0.5314$ | 1.78503 | 26.09 | $R_{11}=3.5240$ |
| $R_{12}=-7.8124$ | $D_8=0.1250$ | 1.69681 | 56.33 | $R_{12}=3.4870$ |
| $R_{13}=+14.3312$ | $S_5$=variable | | | $R_{13}=3.3528$ |

EXAMPLE IV—Continued

| Radius | Thickness or air separation | Refractive index $n_d$ | Abbe V number | Clear diameter |
|---|---|---|---|---|
| $R_{14}=-3.2586$ | $D_9=0.0938$ | 1.69681 | 56.33 | $R_{14}=1.9539$ |
| $R_{15}=+3.2586$ | $D_{10}=0.2657$ | 1.78503 | 26.09 | $R_{15}=2.0536$ |
| $R_{16}=+24.3322$ | $S_6$=variable | | | $R_{16}=2.0774$ |
| $R_{17}=-12.5098$ | $D_{11}=0.3345$ | 1.65031 | 58.60 | $R_{17}=2.2274$ |
| $R_{18}=-3.7028$ | $S_7=0.0078$ | | | $R_{18}=2.2899$ |
| $R_{19}=+10.5352$ | $D_{12}=0.3345$ | 1.65031 | 58.60 | $R_{19}=2.3212$ |
| $R_{20}=-10.5352$ | $S_8=0.0078$ | | | $R_{20}=2.3181$ |
| $R_{21}=+4.8649$ | $D_{13}=0.4689$ | 1.61317 | 59.27 | $R_{21}=2.2837$ |
| $R_{22}=-4.8649$ | $S_9=0.0258$ | | | $R_{22}=2.2259$ |
| $R_{23}=-4.1260$ | $D_{14}=0.1563$ | 1.7282 | 28.66 | $R_{23}=2.2243$ |
| $R_{24}=+27.3461$ | $S_{10}=2.8136$ | | | $R_{24}=2.1602$ |
| $R_{25}=\infty$ | $D_{15}=0.1563$ | 1.76128 | 26.98 | $R_{25}=1.7178$ |
| $R_{26}=+1.8127$ | $S_{11}=0.0119$ | | | $R_{26}=1.7360$ |
| $R_{27}=+1.8913$ | $D_{16}=0.5643$ | 1.65031 | 58.60 | $R_{27}=1.7382$ |
| $R_{28}=-3.5367$ | $S_{12}=0.0078$ | | | $R_{28}=1.7741$ |
| $R_{29}=+3.9463$ | $D_{17}=0.288$ | 1.65031 | 58.60 | $R_{29}=1.7554$ |
| $R_{30}=\infty$ | | | | $R_{30}=1.7100$ |

| $S_3$ | $S_5$ | $S_6$ | F | Log F |
|---|---|---|---|---|
| 0.08691 | 6.36327 | 1.80704 | 1.00000 | 0.00 |
| 2.79776 | 3.51989 | 1.93956 | 1.77827 | 0.25 |
| 4.84917 | 1.50941 | 1.89864 | 3.16227 | 0.50 |
| 6.39100 | 0.04269 | 1.46352 | 5.62339 | 0.75 |
| 7.42307 | 0.41652 | 0.42032 | 10.00000 | 1.00 |

| d | $\Delta S_1$ | $\Delta S_3$ |
|---|---|---|
| $\infty$ | 0 | 0 |
| 900 | −0.1437 | +0.1437 |
| 449 | −0.2907 | +0.2907 |
| 338 | −0.3891 | +0.3891 |
| 282 | −0.4704 | +0.4704 |
| 225 | −0.5955 | +0.5955 |
| 168 | −0.8143 | +0.8143 |
| 113 | −1.2677 | +1.2677 |

Equation for aspheric surface $R_{29}$:

$x=+3.9463-\sqrt{15.57328-y^2}+0.00427020y^6-0.00777096y^8+0.00721693y^{10}$

In all these examples, the maximum value $F_m$ of the equivalent focal length F of the objective is ten times the minimum value $F_o$ thereof. Examples I and II are each corrected for a relative aperture of $f/4.0$, whilst example III is corrected for a relative aperture of $f/2.8$ and example IV for a relative aperture of $f/1.6$. Examples I and II differ from one another in the details of the front member $L_{A1}$ and $L_{A2}$, whilst the movable second and third members $L_B$ and $L_C$ and the stationary rear member $L_D$ are identical in the two examples. The front three members $L_{A1}$, $L_{A2}$, $L_B$ and $L_C$ of example III are similar to those of example I, the dimensions being scaled up from those of example I in the ratio of the f-numbers, that is in the ratio 4.0/2.8. The rear member of example III, however, is not a scaled up version of that of example I. The front three members $L_{A1}$, $L_{A2}$, $L_B$ and $L_C$ of example IV, which includes another alternative construction of rear member, are of the same general type as those of examples I—III, but their numerical dimensions differ somewhat from a version of those of example I scaled up in the ratio 4.0/1.6.

All four examples cover a semiangular field of view varying from 27° at $F_o$ to 2.7° at $F_m$.

The iris diaphragm in all four examples is stationary and is located between the movable third member $L_C$ and the stationary rear member $L_D$. In examples I and II the diaphragm is 0.0625 $F_o$ in front of the surface $R_{17}$ and has diameter 0.8568 $F_o$. In example III the diaphragm is 0.1375 $F_o$ in front of the surface $R_{17}$ and has diameter 1.2240 $F_o$. In example IV the diaphragm is 0.2407 $F_o$ in front of the surface $R_{17}$ and has diameter 2.1446 $F_o$.

The back focal distance from the rear surface of the rear member of the objective to the image plane is 2.8301 $F_o$ in examples I and II, 2.3027 $F_o$ in example III and 1.7878 $F_o$ in example IV.

The equivalent focal length $f_B$ of the movable second member $L_B$ is $-1.4703$ $F_o$ in examples I and II, $-2.1004$ $F_o$ in example III and $-3.6770$ $F_o$ in example IV; the equivalent focal length $f_C$ of the movable third member $L_C$ is $-1.8176$ $F_o$ in examples I and II, $-2.5966$ $F_o$ in example III and $-4.5458$ $F_o$ in example IV; the equivalent focal length $f_D$ of the stationary rear member $L_D$ is $+1.4755$ $F_o$ in examples I and II, $+2.3232$ $F_o$ in example III and $+4.0419$ $F_o$ in example IV; the positive and negative signs respectively indicating convergence and divergence.

The equivalent focal length $f_A$ (for an infinitely distant object) of the complete front member $L_{A1}$ $L_{A2}$ is $+4.4551$ $F_o$ in examples I and II, $+6.3644$ $F_o$ in example III and $+11.1415$ $F_o$ in example IV. This front member consists in all four examples of two portions $L_{A1}$ and $L_{A2}$, of which the front portion $L_{A1}$ is stationary and is slightly divergent, whilst the rear portion $L_{A2}$ is movable for focusing purposes and is convergent. The equivalent focal length of the front portion $L_{A1}$ of the front member is $-31.355$ $F_o$ in example I, $-31.087$ $F_o$ in example II, $-44.764$ $F_o$ in example III and $-77.1924$ $F_o$ in example IV, so that it is approximately $-7$ $f_A$ in all four examples. The equivalent focal length of the rear portion $L_{A2}$ of the front member is $+4.2793$ $F_o$ in example I, $+4.2770$ $F_o$ in example II, $+6.1132$ $F_o$ in example III and $+10.6868$ $F_o$ in example IV, so that it is approximately $+0.961$ $f_A$ in examples I—III and $+0.959 f_A$ in example IV. The fact that the front portion of the front member is not strictly afocal means that the equivalent focal length of the complete front member does vary during the focusing movements, but the variation is very small throughout the whole range of focusing adjustment and is of no disadvantage. Thus, in examples I and II for a focusing change from infinite object distance to the minimum object distance of 45 $F_o$ from the front surface $R_1$, the rear portion of the front member moves forward a distance 0.5069 $F_o$ and the equivalent focal length of the complete front member changes from $+4.4551$ $F_o$ to $+4.5315$ $F_o$. In example III the focusing range extends from infinity to 64.3 $F_o$ in front of the surface $R_1$ and the total forward movement of the rear portion of the front member for the range is 0.7241 $F_o$, the equivalent focal length of the front member changing from $+6.3644$ $F_o$ to $+6.4735$ $F_o$. In example IV the focusing range extends from $\infty$ to 113 $F_o$ in front of the surface $R_1$ and the total forward movement of the rear portion of the front member for the range is 1.2677 $F_o$, the equivalent focal length of the front member changing from $+11.1415$ $F_o$ to $+11.3355$ $F_o$.

In all four examples, the stationary front portion $L_{A1}$ of the front member consists of a meniscus doublet component having its front and rear surfaces concave to the front, the internal contact being dispersive and convex to the front with radius of curvature equal in example I to 7.9114 $F_o$ or 1.776$f_A$, in example II to 7.8125 $F_o$ or 1.754$f_A$, in example III to 11.3019 $F_o$ or 1.776$f_A$ and in example IV to 19.8994 $F_o$ or 1.786$f_A$. The Petzval contributions of the front and rear surfaces of such doublet component are respectively $-0.0794$ /$F_o$ and $+0.0805$ /$F_o$ in example I, $-0.0763$ /$F_o$ and $+0.0788$ $F_o$ in example II, $-0.0556$ /$F_o$ and $+0.0564$ /$F_o$ in example III and $-0.0318$ /$F_o$ and $+0.0321$ /$F_o$ in example IV.

The maximum value of the ratio of the equivalent focal length of the complete objective to the $f$-number of the objective is 2.5 $F_o$ in examples I and II, 3.57 $F_o$ in example III and 6.25 $F_o$ in example IV, so that the equivalent focal length $f_A$ of the complete front member $L_{A1}$ $L_{A2}$ is 1.78 times such maximum ratio in all four examples.

The arithmetic mean of the Abbe V numbers of the materials of the three convergent elements of the front member $L_{A1}$ $L_{A2}$ is 50.33 in examples I and III, 52.83 in example II and 50.36 in example IV and thus exceeds the Abbe V numbers of the divergent front element in such member by 24.23 in examples I and III, by 26.05 in example II and by 24.26 in example IV. In the front portion $L_{A1}$ alone the difference between the Abbe V numbers of the materials of the two elements is 25.92 in examples I and III, 32.76 in example II and 26.01 in example IV, and the difference between their mean refractive indices is 0.21 in examples I, III, and IV and 0.22 in example II.

The front surface $R_1$ of the front member has dispersive optical power numerically equal to 0.1418/$F_o$ or 0.6317/$f_A$ in example I, 0.1345/$F_o$ or 0.5992/$f_A$ in example II, 0.0992/$F_o$ or 0.6313/$f$ in example III and 0.0567/$F_o$ or 0.6317/$f_A$ in example IV.

The movable rear portion $L_{A2}$ of the front member has an equivalent focal length equal to $+4.2793$ $F_o$ or 0.961 $f_A$ in example I, to $+4.2770$ $F_o$ or 0.960$f_A$ in example II, to $+6.1132$ $F_o$ or 0.961$f_A$ in example III and to $+10.6868$ $F_o$ or 0.959$f_A$ in example IV. Such rear portion $L_{A2}$ consists in all four examples of two simple convergent components having their front surfaces convex to the front. The radius of curvature $R_4$ of the front surface of the first of such simple components is 10.1825 $F_o$ or 2.286$f_A$ in example I, 10.0725 $F_o$ or 2.261 $f_A$ in example II, 14.5462 $F_o$ or 2.286 $f_A$ in example III and 26.0995 $F_o$ or 2.343$f_A$ in example IV. The radius of curvature $R_6$ of the front surface of the second of such simple components is 3.7789 $F_o$ or 0.848 $f_A$ in example I, 3.7338 $F_o$ or 0.838 $f_A$ in example II, 5.3984 $F_o$ or 0.848 $f_A$ in example III and 9.4373 $F_o$ or 0.847 $f_A$ in example IV.

The rear surface of the rear portion $L_{A2}$ of the front member is convex to the front in all four examples, and its radius of curvature $R_7$ is 13.9198 $F_o$ or 3.124 $f_A$ in example I, 13.2696 $F_o$ or 2.979$f_A$ in example II, 19.8853 $F_o$ or 3.124$f_A$ in example III and 34.9140 $F_o$ or 3.134$f_A$ in example IV.

The axial thickness ($D_1+D_2$) of the doublet component of the front member is 0.7669 $F_o$ or 0.1722 $f_A$ in example I, 0.7844 $F_o$ or 0.1761 $f_A$ in example II, 1.0957 $F_o$ or 0.1722$f_A$ in example III, and 1.9226 $F_o$ or 0.1726 $f_A$ in example IV. The sum of the axial thicknesses ($D_3+D_4$) of the two simple components of the front member is 0.5531 $F_o$ in examples I and II, 0.7902 $F_o$ in example III and 1.3834 $F_o$ in example IV, that is 0.1242$f_A$ in all four examples.

In all four examples the minimum separation between the movable second and third members $L_B$ and $L_C$ of the objective occurs when the equivalent focal length F of the objective is 7.45 $F_o$, and the numerical values of the equivalent focal lengths $f_B$ and $f_C$ of such members are respectively 5.88 and 7.27 times the minimum value of the ratio of the equivalent focal length of the objective to the $f$-number of the objective.

The movable second member $L_B$ in all four examples consists of a divergent simple meniscus component with its surfaces convex to the front followed by a divergent triplet component having a convergent element between two divergent elements, and its total axial movement in the range of variation is numerically equal to 1.994$f_B$.

The movable third member $L_C$ in all four examples consists of a doublet component, whose front surface $R_{14}$ is concave to the front with radius of curvature numerically equal to 0.72$f_C$, and the total axial movement of such member in the range of variation is numerically equal to 0.363$f_C$.

In all four examples, the various aberrations are well stabilized in the front three members $L_{A1}$ $L_{A2}$, $L_B$ and $L_C$ throughout the range of variation of the equivalent focal length of the objective and also throughout the focusing range, and the stationary rear member $L_D$ serves to balance out such residual stabilized aberrations and also to locate the resultant image plane in a convenient position. The construction of such rear member $L_D$ may thus vary widely.

In examples I and II, such rear member may be described as of modified Cooke triplet construction, wherein the strong convergent power needed at the front to deal with the relatively widely divergent beam received from the third member $L_C$ is achieved by the use of three simple convergent components, which are followed by a simple divergent component and a convergent doublet component Such construction makes it possible, with suitable dimensioning, to balance out the residual stabilized aberrations (especially the primary aberrations) of the front three members, and an aspheric surface is provided in both examples to assist in correcting the higher order aberrations, such aspheric surface being the front surface $R_{23}$ of the simple divergent component, where it can be employed for the simultaneous correction of spherical aberration and coma with minimum effect on oblique aberrations.

In example III, a somewhat different type of stationary rear member $L_D$ is used, which may be described as of modified Petzval construction. In this case, six simple components are used, the first three again being convergent to give the necessary strong convergent power at the front, whilst the next two are divergent and the sixth is convergent. Although no aspheric surface is used in the actual example given, some further improvement in higher order aberration correction could be achieved by incorporating such a surface.

Yet another alternative construction for the stationary rear member $L_D$ is employed in example IV, consisting of seven simple components, the first three and the last two being convergent, whilst the fourth and fifth are divergent. An aspheric surface is again used, in this case the front surface $R_{29}$ of the rearmost component.

Example V, now to be described, uses a front member $L_{A1}$, $L_{A2}$ in accordance with the present invention in conjunction with a different arrangement of the movable members, wherein the movable second member $L_B$ is divergent and the movable third member $L_C$ is convergent, the arrangement being developed from that forming the subject of the copending application, Ser. No. 288,412 above mentioned. The second, third and fourth members $L_B$, $L_C$ and $L_D$ are in fact a scaled version of the corresponding members of the first example given in the specification of such copending application.

EXAMPLE V

| Radius | Thickness or air separation | Refractive index $n_d$ | Abbé V number | Clear diameter |
|---|---|---|---|---|
| $R_1=-3.4427$ | | | | $R_1=2.169$ |
| | $D_1=0.0844$ | 1.7847 | 26.10 | |
| $R_2=+4.9209$ | | | | $R_2=2.195$ |
| | $D_2=0.3926$ | 1.57427 | 52.02 | |
| $R_3=-2.8171$ | | | | $R_3=2.201$ |
| | $S_1=0.3192$ | | | |
| $R_4=+6.3336$ | | | | $R_4=2.114$ |
| | $D_3=0.1594$ | 1.6888 | 49.48 | |
| $R_5=-13.1647$ | | | | $R_5=2.105$ |
| | $S_2=0.0019$ | | | |
| $R_6=+2.3505$ | | | | $R_6=1.941$ |
| | $D_4=0.1846$ | 1.6888 | 49.48 | |
| $R_7=+8.6582$ | | | | $R_7=1.919$ |
| | $S_3=$variable | | | |
| $R_8=+3.2914$ | | | | $R_8=1.092$ |
| | $D_5=0.0425$ | 1.6968 | 55.61 | |
| $R_9=+0.5627$ | | | | |
| | $D_6=0.1837$ | 1.7847 | 26.10 | |
| $R_{10}=+0.9223$ | | | | $R_{10}=0.851$ |
| | $S_4=0.2263$ | | | |
| $R_{11}=-1.5531$ | | | | $R_{11}=0.825$ |
| | $D_7=0.0385$ | 1.6968 | 55.61 | |
| $R_{12}=+3.8674$ | | | | $R_{12}=0.840$ |
| | $S_5=$variable | | | |
| $R_{13}=+4.8792$ | | | | $R_{13}=0.848$ |
| | $D_8=0.0990$ | 1.6510 | 58.60 | |
| $R_{14}=-2.2293$ | | | | $R_{14}=0.855$ |
| | $S_6=0.0014$ | | | |
| $R_{15}=+1.9767$ | | | | $R_{15}=0.854$ |
| | $D_9=0.1653$ | 1.6968 | 55.61 | |
| $R_{16}=-1.3611$ | | | | |
| | $D_{10}=0.0470$ | 1.7847 | 26.10 | |
| $R_{17}=-32.1130$ | | | | $R_{17}=0.829$ |
| | $S_7=$variable | | | |
| $R_{18}=+0.7604$ | | | | $R_{18}=0.524$ |
| | $D_{11}=0.0895$ | 1.61323 | 36.92 | |
| $R_{19}=+1.1087$ | | | | $R_{19}=0.493$ |
| | $S_8=0.1424$ | | | |
| $R_{20}=-1.4715$ | | | | $R_{20}=0.450$ |
| | $D_{12}=0.1837$ | 1.61342 | 59.27 | |
| $R_{21}=+0.7630$ | | | | $R_{21}=0.417$ |
| | $S_9=0.2211$ | | | |
| $R_{22}=-6.9454$ | | | | $R_{22}=0.517$ |
| | $D_{13}=0.0448$ | 1.62049 | 36.24 | |
| $R_{23}=+1.3175$ | | | | |
| | $D_{14}=0.1165$ | 1.61342 | 59.27 | |
| $R_{24}=-0.7208$ | | | | $R_{24}=0.557$ |

| $S_3$ | $S_5$ | $S_7$ | F | Log F |
|---|---|---|---|---|
| 0.03631 | 2.08161 | 0.06723 | 1.000 | 0.0000 |
| 0.37563 | 1.56792 | 0.24159 | 1.526 | 0.1836 |
| 0.66256 | 1.05424 | 0.46834 | 2.400 | 0.3802 |
| 0.89113 | 0.54057 | 0.75345 | 3.819 | 0.5820 |
| 1.06367 | 0.02688 | 1.09459 | 6.000 | 0.7782 |

| d | $\Delta S_1$ | $\Delta S_2$ |
|---|---|---|
| ∞ | 0 | 0 |
| 222 | −0.0358 | +0.0358 |
| 111 | −0.0723 | +0.0723 |
| 84 | −0.0968 | +0.0968 |
| 56 | −0.1481 | +0.1481 |
| 42 | −0.2026 | +0.2026 |
| 28 | −0.3153 | +0.3153 |

In this example, the maximum value $F_m$ of the equivalent focal length F of the complete objective is six times the minimum value $F_o$ thereof. The example is corrected for a relative aperture f/4.0 and covers a semiangular field of view varying from 18° at $F_o$ to 3° at $F_m$. The iris diaphragm is stationary and is located between the third and fourth members at a position 0.014 $F_o$ in front of the surface $R_{18}$ and has diameter 0.540 $F_o$. The back focal distance from the rear surface $R_{24}$ of the objective to the image plane is 1.752 $F_o$.

The equivalent focal length $f_B$ of the movable divergent second member $L_B$ is −0.8959 $F_o$; the equivalent focal length $f_C$ of the movable convergent third member $L_C$ is +1.3599 $F_o$; and the equivalent focal length $f_D$ of the convergent stationary rear member $L_D$ is +13.3238 $F_o$.

The equivalent focal length $f_A$ (for an infinitely distant object) of the complete front member $L_{A1}$, $L_{A2}$ is +2.7711 $F_o$. The stationary front portion $L_{A1}$ of such front member is again slightly divergent with equivalent focal length −19.490 $F_o$ or approximately $-f_A$. The equivalent focal length of the rear portion $L_{A2}$ of the front member is +2.6617 $F_o$ or +0.96 $f_A$. Again, the departure from strict afocality in the front portion $L_{A1}$ is insufficient to make any material difference to the performance of the objective. The focusing range extends from infinity to 28 $F_o$ and the total forward movement of the rear portion $L_{A2}$ during such change is 0.3153 $F_o$.

The stationary front portion $L_{A1}$ of the front member again consists of a meniscus doublet component with its outer surfaces concave to the front, the internal contact in such doublet component being dispersive and convex to the front with radius of curvature $R_2$ equal to 1.776 $f_A$. The Petzval contributions of the front and rear surfaces $R_1$ and $R_3$ of such doublet component amount respectively to −0.1277 /$F_o$ and +0.1295 /$F_o$. The front surface $R_1$ has dispersive optical power numerically equal to 0.2279 /$F_o$ or to 0.6316 /$f_A$.

The arithmetic mean of the Abbe V numbers of the materials of the three convergent elements of the front member is 50.33 exceeding that of the divergent element by 24.23. In the stationary front portion $L_{A1}$ alone, the Abbe V number difference is 25.92 and the mean refractive index difference is 0.21.

The maximum value of the ratio of the equivalent focal length of the objective to the f-number of the objective is 1.5 $F_o$, so that the equivalent focal length $f_A$ of the complete front member is 1.85 times such maximum ratio.

The movable rear portion $L_{A2}$ of the front member again consists of two simple convergent components having their front surfaces convex to the front. The radius of curvature $R_4$ of the front surface of the first of such simple components is 2.286 $f_A$, whilst the radius of curvature $R_6$ of the front surface of the other simple component is 0.848 $F_A$. The radius of curvature $R_7$ of the rear surface of the front component is 3.124 $f_A$.

The axial thickness ($D_1+D_2$) of the doublet component is 0.4770 $F_o$ or 0.1722 $f_A$ and the sum of the axial thickness ($D_3+D_{4a}$) of the two simple convergent components is 0.3440 $F_o$ or 0.1242 $f_A$.

The divergent movable second member $L_B$ of the objective consists of a divergent meniscus doublet component in front of a divergent simple component, and the convergent movable third member $L_C$ consists of a convergent simple component in front of a convergent doublet component having a dispersive internal contact.

The movable system comprising the second and third members $L_B$ $L_C$ performs as a whole an axial movement bearing a nonlinear relationship to the movement of the zoom control element, and at the same time, within such movable system the second and third members $L_B$ and $L_C$ perform equal and opposite axial movements each bearing a linear relationship to the movement of the zoom control element, the two members moving towards one another during change from smaller to larger values of the equivalent focal length of the objective.

The total axial movement of the divergent second member $L_B$ in the range of variation is 1.02736 $F_o$ or (numerically) 1.1467 $f_B$ and such movement is equal to the total axial movement of the convergent third member $L_C$.

The aberrations are well stabilized in the front three members throughout the zooming range and throughout the focusing range, and are balanced out in the stationary rear member $L_D$, which in this example has three components, the first being a meniscus convergent simple component with its surfaces convex to the front, the second a divergent simple component, and the third a meniscus convergent doublet component with its outer surfaces concave to the front.

It is often desired in practice to provide two different ranges of variation of the equivalent focal length of the objective, and with the objective according to the present invention this can be carried out in a simple way by the provision of an achromatic doublet component, which can be placed at will behind the stationary rear member $L_D$ of the objective, such doublet component, when in position, acting to move the resultant image plane further from the rear surface of the member $L_D$ and to increase the values of the equivalent focal length of the objective in the same proportion throughout the range. Another effect of the addition of this doublet component is to reduce the relative aperture of the objective and the angular field covered. Numerical data are given below of two alternative examples of achromatic doublet component suited to follow the rear member $L_D$ of example I above. FIGS. 6 and 7 respectively show these two examples of doublet component $L_E$ in position behind the main objective, which for simplicity is shown only in skeleton form, the front and rear surfaces only being shown for each of the four members $L_A$, $L_B$, $L_C$ and $L_D$ of the objective.

EXAMPLE VI

| Radius | Thickness or air separation | Refractive index $n_d$ | Abbé V number | Clear diameter |
|---|---|---|---|---|
| $R_{28}=\infty$ | $S_{11}=0.2812$ | | | $R_{28}=0.7312$ |
| $R_{29}=2.0920$ | $D_{17}=0.0781$ | 1.70035 | 30.28 | $R_{29}=0.7312$ |
| $R_{30}=+3.3428$ | $D_{18}=0.0500$ | 1.60483 | 43.83 | $R_{30}=0.7312$ |

EXAMPLE VII

| Radius | Thickness or air separation | Refractive index $n_d$ | Abbé V number | Clear diameter |
|---|---|---|---|---|
| $R_{28}=\infty$ | $S_{11}=0.7369$ | | | $R_{28}=0.6749$ |
| $R_{29}=-2.0920$ | $D_{17}=0.0781$ | 1.70035 | 30.28 | $R_{29}=0.6749$ |
| $R_{30}=+2.0920$ | $D_{18}=0.0500$ | 1.60982 | 53.31 | $R_{30}=0.6749$ |

The dimensions in these two examples of achromatic doublet component are given in terms of the minimum value $F_o$ of the equivalent focal length for the objective of example I. In each table $S_{11}$ represents the air separation between the rear surface $R_{27}$ of the stationary rear member $L_D$ of example I and the front surface $R_{28}$ of the added doublet component. The doublet component in each case consists of a convergent element in front of a divergent element.

The added doublet component $L_E$ of example VI increases the values of the equivalent focal length in the ratio 3:2, so that the normal range from $F_o$ to 10 $F_o$ is altered by the doublet component into a range from 1.5 $F_o$ to 15 $F_o$. The doublet component of example VII acts to double the values of the equivalent focal length of example I, thus giving a range from 2 $F_o$ to 20 $F_o$ when the doublet component is in position.

The back focal distance from the rear surface $R_{30}$ of the added doublet component $L_E$ to the new position of the resultant image plane is 3.704 $F_o$ in example VI and 4.028 $F_o$ in example VII. The relative aperture of the objective is changed from $f/4.0$ by the addition of the doublet component to $f/6.0$ in example VI and $f/8.0$ in example VII. The semiangular field, which for example I alone varies from 27° at $F_o$ to 2.7° at $F_m$, varies (when the doublet component of example VI is added) from 18° at 1.5 $F_o$ to 1.8° at 15 $F_o$, and (when the doublet component of example VII is added) from 13.5° at 2 $F_o$ to 1.35° at 20 $F_o$.

It will be realized that the addition of only an achromatic doublet component to an already well corrected objective must necessarily result in a lower standard of aberration correction when the doublet component is in place. But, the increased equivalent focal length and reduced relative aperture and angular field do not call for so high a standard of correction as is needed when the objective is used alone, and for many practical purposes the standard of correction obtained with the doublet component added is adequate.

The necessary axial movement of the second and third members may be brought about in various ways, for example by means of two appropriately shaped cams, which may be in the form of cam grooves on the inner surface of a tubular member rotated by the zoom control element and surrounding the second and third members, which are held against rotation relatively to the fixed casing of the objective. The focusing movement of the rear portion $L_{A2}$ of the front member may be effected under the control of a focusing control element by mounting such rear portion $L_{A2}$ in screw-threaded engagement with the fixed casing of the objective.

It is to be understood that the foregoing arrangements have been given by way of example only and that the invention can be carried into practice in other ways. Thus, with other arrangements of the members of the objective movable for zooming purposes, it would be possible for the stationary front portion of the front member to be strictly afocal or to be slightly convergent. The use of a slightly divergent stationary front portion, however, is advantageous, not only in its contribution towards the rearward disposition of the rear nodal point of the front member, but also because it tends to widen the angular field of view of the objective. Again, with a narrower relative aperture it is possible for the movable rear portion of the front member to consist of a single simple convergent component.

What we claim as our invention and desire to secure by Letters Patent is:

1. In an optical objective of the zoom type including:
   means in the form of an intermediate assembly comprising relatively axially movable members for continuously varying the equivalent focal length of said objective over said zooming range,
   means comprising a front member for cooperating with said intermediate assembly to stabilize aberrations over said zooming range, said front member remaining stationary during the zooming movements, and
   means in the form of a stationary rear member for balancing out said stabilized aberrations,
   said assembly being located between said front and rear members and an aperture stop being located between said assembly and rear member,
   all of said means cooperating as essential components to maintain the position of the image plane constant throughout the zooming range and constituting in combination an objective which is corrected for spherical and chromatic aberrations, coma, astigmatism and distortion,
   the improvement according to which said front member comprises front and rear portions, said front portion being stationary during both zooming and focusing movements and having an equivalent focal length substantially equal to $7f_A$, where $f_A$ is the equivalent focal length of the complete front member for an infinitely distant object, and said rear portion being axially movable to focus the objective to suit different object distances and being convergent, with an equivalent focal length substantially equal to $0.96f_A$.

2. An optical objective as claimed in claim 1, in which spherical aberration and astigmatism are stabilized throughout the focusing range by utilizing for divergent and convergent elements materials whose mean refractive indices differ by substantially 0.21—0.22.

3. An optical objective as claimed in claim 2 in which chromatic aberrations are stabilized throughout the focusing range by forming the stationary front portion of the front member from a divergent element and a convergent element made of materials whose Abbe V numbers differ by substantially 25.92.

4. An optical objective as claimed in claim 2 in which chromatic aberrations are stabilized throughout the focusing range by forming the stationary front portion of the front member from a divergent element and a convergent element made of materials whose Abbe V numbers differ by substantially 26.01.

5. An optical objective as claimed in claim 2 in which chromatic aberrations are stabilized throughout the focusing range by forming the stationary front portion of the front member from a divergent element and a convergent element made of materials whose Abbe V numbers differ by substantially 32.76.

6. An optical objective as claimed in claim 1, in which the rear surface of the rear portion of the front member is convex to the front with radius of curvature substantially equal to 3.04—5.1.

7. An optical objective as claimed in claim 6, in which the front portion of the front member includes a divergent element made of a material the Abbe V number of which is exceeded by substantially 24 by the arithmetic mean of the Abbe V numbers of the convergent elements of the complete front member.

8. An optical objective as claimed in claim 6, in which the equivalent focal length $f_A$ of the complete front member is substantially 1.78 times the maximum value of the ratio between the equivalent focal length of the complete objective and the $f$-number of the objective.

9. An optical objective as claimed in claim 1, in which the equivalent focal length $f_A$ of the complete front member is substantially 1.78 times the maximum value of the ratio between the equivalent focal length of the complete objective and the $f$-number of the objective, the arithmetic mean of the Abbe V numbers of the convergent elements of the complete front member exceeding the Abbe V number of the said divergent element by substantially 24.

10. An optical objective as claimed in claim 9 in which the stationary front portion of the front member consists of a divergent element and a convergent element made of materials whose Abbe V numbers differ by 25.92.

11. An optical objective as claimed in claim 9 in which the stationary front portion of the front member consists of a divergent element and a convergent element made of materials whose Abbe V numbers differ by 26.01.

12. An optical objective as claimed in claim 9 in which the stationary front portion of the front member consists of a divergent element and a convergent element made of materials whose Abbe V numbers differ by 32.76.

13. An optical objective as claimed in claim 1, in which the stationary front portion of the front member consists of a meniscus doublet component having its front and rear surfaces concave to the front.

14. An optical objective as claimed in claim 13, in which the Petzval contribution of the front surface of the doublet component of the front member is substantially equal to that of the rear surface of such doublet component, and the internal contact in such doublet component is convex to the front with radius of curvature substantially equal to $1.75f_A - 1.79F_A$.

15. An optical objective as claimed in claim 14, in which the front surface of the said doublet component has dispersive optical power substantially equal to $0.6f_A - 0.63f_A$.

16. An optical objective as claimed in claim 13, in which the internal contact in the doublet component of the front member is convex to the front with radius of curvature substantially equal to $1.75f_A - 1.79f_A$, and the difference between the mean refractive indices of the materials of the two elements of such doublet component lies between substantially 0.21—0.22.

17. An optical objective as claimed in claim 13, in which the Petzval contribution of the front surface of the doublet component of the front member is substantially equal to that of the rear surface of such component, and the arithmetic mean of the Abbe V numbers of the materials of the convergent elements of the complete front member exceeds the Abbe V number of the material of the divergent element of such component by substantially 24.

18. An optical objective as claimed in claim 13, in which the movable rear portion of the front member consists of two simple convergent components.

19. An optical objective as claimed in claim 18, in which the axial thickness of the meniscus doublet component of the front member is substantially $0.17 - 0.18 f_A$ and is greater than the sum of the axial thicknesses of the two simple components of the front member, which sum is substantially equal to $0.12 f_A$.

20. An optical objective as claimed in claim 1, in which the movable rear portion of the front member consists of two simple convergent components.

21. An optical objective as claimed in claim 20, in which the axial thickness of the meniscus doublet component of the front member is substantially $0.17 - 0.18 f_A$ and is greater than the sum of the axial thicknesses of the two simple components of the front member, which sum is substantially equal to $0.12 f_A$.

22. An optical objective as claimed in claim 20, in which the front surfaces of the two simple components of the front member are convex to the front, the radius of curvature of the more forward of such front surfaces being substantially $2.26 - 2.34 f_A$ and greater than twice the radius of curvature of the more rearward of such front surfaces, which latter radius of curvature is substantially $0.84 - 0.85 f_A$.

23. An optical objective as claimed in claim 20, in which the rear surface of the rear portion of the front member is convex to the front with radius of curvature substantially equal to 3.0—3.13.

24. An optical objective as claimed in claim 1, in which the stationary rear member is convergent, and the assembly incorporating the members movable for zooming purposes comprises two movable divergent members respectively constituting the second and third members of the objective.

25. An optical objective as claimed in claim 24, in which the minimum separation between the movable second and third members of the objective occurs when the equivalent focal length of the complete objective is substantially 0.745 times its maximum value in the range of variation, and the numerical values of the equivalent focal lengths $f_B$ and $f_C$ respectively of the movable second and third members are respectively substantially 5.88 times the minimum value of the ratio of the equivalent focal length of the objective to the $F$-number of the objective in the range of variation and substantially 7.27 times such minimum ratio.

26. An optical objective as claimed in claim 24, in which the movable second member consists of a divergent simple meniscus component with its surfaces convex to the front followed by a divergent compound component, and performs in the range of variation a total axial movement equal to substantially 1.99 times the numerical value of the equivalent focal length $f_B$ of the movable second member.

27. An optical objective as claimed in claim 24, in which the movable third member of the objective consists of a doublet component having its front surface concave to the front with radius of curvature equal to substantially 0.72 times the numerical value of the equivalent focal length $f_t$ of such member, and performs in the range of variation a total axial movement equal to substantially $0.363 f_t$.

28. An optical objective as claimed in claim 1, in which the assembly incorporating the members movable for zooming purposes comprises a movable divergent member constituting the second member of the objective, in front of a movable convergent member constituting the third member of the objective.

29. An optical objective as claimed in claim 28, in which the total axial movement of the divergent second member of the objective relatively to the stationary members of the objective in the range of variation is numerically equal to substantially $1.15 f_B$, where $f_B$ is the equivalent focal length of such second member, which movement is substantially equal to the total axial movement of the convergent third member of the objective.

30. An optical objective as claimed in claim 1, including an achromatic doublet component which can be placed at will behind the stationary rear member of the objective to increase the values of the equivalent focal length of the objective by a chosen ratio throughout its range of variation.

31. An optical objective as claimed in claim 30, in which the stationary rear member is convergent, and the assembly incorporating the members movable for zooming purposes comprises two movable divergent members respectively constituting the second and third members of the objective.

32. An optical objective as claimed in claim 30, in which the stationary front portion of the front member consists of a meniscus doublet component having its front and rear surfaces concave to the front, and the movable rear portion of the front member consists of two simple convergent components.